United States Patent [19]

Mata et al.

[11] Patent Number: 5,922,191

[45] Date of Patent: *Jul. 13, 1999

[54] FOAM CONTROL USING A FLUIDIZED BED OF PARTICLES

[75] Inventors: Clara Mata, Lauderdale, Minn.; Jose Guitian, Caracas, Venezuela; Daniel D. Joseph, Minneapolis, Minn.; Julio Krasuk, Caracas, Venezuela

[73] Assignee: Intevep, S.A., Caracas, Venezuela

[ * ] Notice: This patent is subject to a terminal disclaimer.

[21] Appl. No.: 08/882,316

[22] Filed: Jun. 25, 1997

Related U.S. Application Data

[63] Continuation-in-part of application No. 08/725,485, Oct. 4, 1996.
[51] Int. Cl.[6] ...................................................... B01D 19/02
[52] U.S. Cl. ............................ 208/46; 208/108; 208/112; 203/20; 95/155; 95/242
[58] Field of Search .............................. 208/46, 108, 112; 203/20; 95/155, 242

[56] References Cited

U.S. PATENT DOCUMENTS

| 4,851,107 | 7/1989 | Kretschmar et al. | 208/108 |
| 5,166,118 | 11/1992 | Kretschmar et al. | 502/185 |

*Primary Examiner*—Walter D. Griffin
*Attorney, Agent, or Firm*—Bachman & LaPointe, P.C.

[57] ABSTRACT

A process for suppressing foam formation in a vessel includes the steps of feeding a liquid and a gas to a vessel at a liquid velocity and a gas velocity respectively; adding particles of a solid material to the liquid, the particles having a particle size and particle density; and selecting at least one of the liquid velocity, particle size and particle density so as to fluidize the particles in the liquid, whereby foam formation in the vessel is suppressed. The particles are preferably liquid phase phobic particles.

19 Claims, 11 Drawing Sheets

FOAM CONTROL USING A FLUIDIZED BED OF PARTICLES

CROSS REFERENCE TO RELATED APPLICATION

This application is a Continuation-in-Part of U.S. application Ser. No. 08/725,485, filed Oct. 4, 1996.

BACKGROUND OF THE INVENTION

The invention relates to a process for suppressing foam formation in a vessel such as a bubble column reactor.

Bubble column reactors are typically a substantially vertical column into which are introduced a liquid and a gas which at reactor conditions are treated to obtain a desired product.

Foaming in chemical reactors, especially bubble column reactors, reduces the liquid volume available for desired reactions. This is particularly well known in hydroconversion reactors, for example for hydrocracking of heavy crudes into light products such as naphthas and distillates. Also, foaming tendencies have been evident in coal liquefaction reactors of the bubble column type and in Fischer Tropsch reactors of certain types. A bubble column reactor which experiences foaming can result in up to 80% or more in the reactor volume being occupied by gas, and consequently at most only about 20% of the volume of the reactor is available for the desired conversion. Foaming is also experienced in other areas such as flotation of minerals, enhanced oil recovery, drilling in oil reservoirs, insulation, construction and refining processes such as vacuum distillation and delayed coking.

One known method for avoiding foaming is to add anti-foaming agents such as silicone oils, polyglycols and the like. However, these agents are cracked under the severe conditions present in the reactors. For example, in a hydrocracking reactor, anti-foaming agents are exposed to hydrogen pressures over 100 bar and temperatures of 400° C. or higher. Anti-foaming agents tend to crack into different chemical products which contaminate the liquid and gas in the reactor. In addition to requiring more frequent catalyst replacement in the downstream hydrodesulfurization reactors, such cracking of anti-foaming agents also tends to increase the operating costs of the overall process.

The need remains for a process for suppressing foam which is effective without significantly increasing the cost of the process carried out in the vessel or reactor.

The need also remains for a process for reducing foam which does not result in additional materials added to the reactor which can be altered or cracked by the conditions in the reactor.

It is therefore the primary object of the present invention to provide a process for suppressing foam formation which is simple and inexpensive.

It is a further object of the present invention to provide a process for suppressing foam formation which does not result in contamination of products from the reactor.

It is a still further object of the present invention to provide a process for foam suppression which can be employed in a hydroconversion reactor without requiring excessive additional materials.

Other objects and advantages of the present invention will appear hereinbelow.

SUMMARY OF THE INVENTION

In accordance with the invention, the foregoing objects and advantages are readily attained.

According to the invention, a process is provided for suppressing foam formation in a vessel which comprises the steps of feeding a liquid and a gas to a vessel at a liquid velocity and a gas velocity respectively, adding particles of a solid material to said liquid, said particles having a particle size and particle density; and selecting at least one of said liquid velocity, particle size and particle density so as to fluidize said particles in said liquid, whereby foam formation in said vessel is suppressed.

In further accordance with the invention, the affinity of the particles for the liquid phase has been found to be important, and the most preferred particles have a contact angle with the liquid phase greater than or equal to about 90°, most preferably greater than 90°, and will be referred to as liquid phase phobic particles.

In further accordance with the invention, a process is provided wherein the particles are selected having a particle size and particle density such that the particles are fluidized in the liquid without being entrained by either the gas or the liquid so that the particles are substantially homogeneously dispersed and mobile within the liquid.

BRIEF DESCRIPTION OF THE DRAWINGS

A detailed description of preferred embodiments of the present invention follows, with reference to the attached drawings, wherein.

DETAILED DESCRIPTION

The invention relates to a process for suppressing foam formation in a vessel such as a bubble column reactor and the like.

Figure 1:
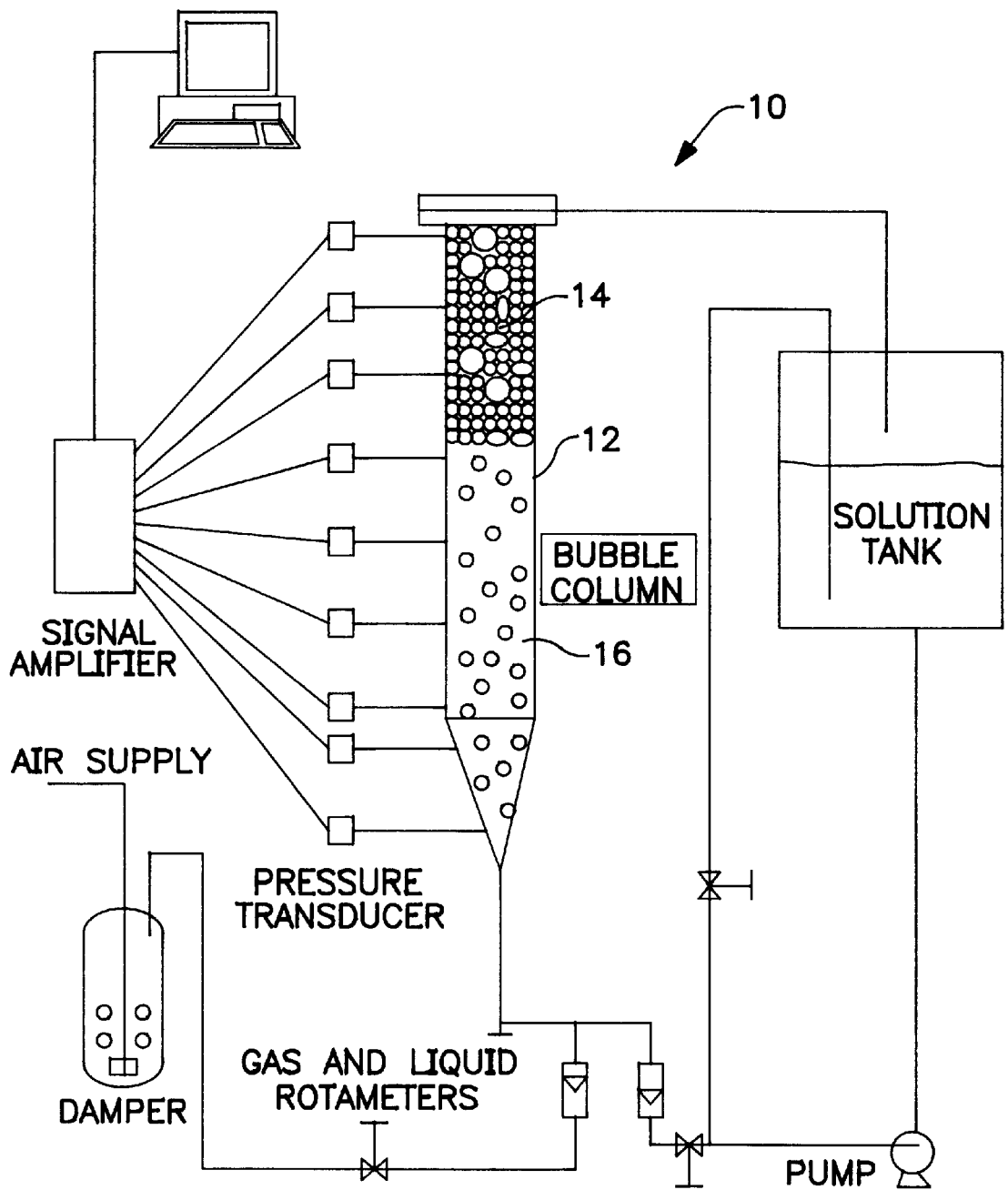
FIG. 1 is a schematic diagram of a bubble column reactor system.

FIG. 1 shows a schematic representation of a typical bubble column reactor 10 wherein gas and liquid are fed to a reaction chamber 12 at desired conditions to accomplish a desired reaction.

The gas and liquid are fed to reactor 10 at superficial gas and liquid velocities, respectively. Gas superficial velocity can typically be in the range of 0.1 cm/s to about 20 cm/s, while typical liquid superficial velocity is between about 0.1 to about 2 cm/s. Certain combinations of gas and liquid velocity lead to foaming characteristics which, as illustrated in FIG. 1, can lead to significant portions 14 of the internal volume of reactor 10 being filled with foam. As the volume of portions 14 filled with foam increases, portions 16 of the volume in the reactor filled with liquid in which the desired reaction is carried out, decreases. This is undesirable because the efficiency of the process carried out in the reactor is decreased.

In accordance with the present invention, a process is provided wherein a solid particulate material is added to the liquid phase so as to suppress foam formation in the reactor. According to the invention, particles can be confined within the reactor for mixing with liquid upon feed to the reactor. Alternatively, particles can be added to liquid before fed to the reactor or can be added by gravity from inside the reactor for example using a lock hopper or other feed system, and the like, to release the particles from within the reactor or other vessel.

A wide range of types of solid particles can be added to the liquid and fluidized therein so as to suppress foaming of the system according to the invention. In accordance with the invention, particles having certain characteristics are especially effective at suppressing foaming in a bubble column reactor or other vessel. It has been found that the particle affinity to the liquid phase of the system matters. In this regard, the particles may have an affinity for the liquid phase, referred to herein as being liquid phase philic, or philic, or may have less or no affinity for the liquid phase, referred to herein as being liquid phase phobic or phobic. Although liquid phase philic particles having a contact angle of less than 90° reduce foaming satisfactorily, phobic particles have been found to provide excellent results in suppressing foam. Suitable phobic particles for use in accordance with the invention have been found to have a contact angle with the liquid in question of greater than or equal to about 90°, most preferably greater than about 90°.

In further accordance with the invention, it is preferred that the particles have a particle size and particle density which are selected so as to provide particles which are fluidized in the liquid phase, without being entrained by either the liquid or gas phase, so that the particles are substantially homogeneously dispersed throughout the liquid phase as a fluidized bed without being carried into the foam phase of the reactor, or into the outlet portion of the reactor. This is desirable so that the solid particles circulate within the liquid phase in the reactor so as to attain maximum contact with the liquid phase without forming sedimentation in the bottom of the reactor.

Depending upon reaction conditions and liquid characteristics, the superficial liquid and gas velocity ($v_L$, $v_g$), liquid and gas viscosity ($\mu_L$, $\mu_g$) and liquid and gas density, a particular system will have a minimum fluidization velocity ($U_{Lm}$), as well as a particle settling velocity in the gas phase ($V_{pmg}$) and a particle settling velocity in the liquid phase ($V_{pmL}$). According to the invention, the particle size and density of the particles to be added are preferably selected so as to provide a minimum fluidization velocity ($U_{Lm}$) which is less than the desired liquid superficial velocity ($v_L$), and to provide a particle settling velocity in the liquid phase ($V_{pmL}$) which is greater than the superficial liquid velocity ($v_L$). Thus, the particle size and density are preferably selected so as to provide $U_{Lm} < V_L$; and $v_{pmL} > V_L$. This advantageously serves to cause the particles to expand in a fluidized bed in the bubbly liquid mixture below the foam.

In further accordance with the invention, the particles are also preferably selected so as to provide a particle settling velocity in the gas phase which is greater than the superficial gas velocity in the reactor, in other words, $v_g < V_{pmg}$.

In accordance with the foregoing, particles having selected density and particle size will be fluidized, or substantially homogeneously dispersed throughout the liquid phase, without being entrained in significant portions into the foam and toward the outlet of the reactor. Further, fluidized particles advantageously circulate through the liquid providing an increase of liquid hold up and enhanced foam suppression.

It is preferred that particles according to the invention be added or mixed with the liquid phase in an amount of at least about 1% wt., preferably between about 1% to about 6% wt. based on liquid flow to the reactor.

In accordance with the invention, solid particles are preferably provided of a material selected from the group consisting of alumina, glass, coke, lignite, polytetrafluoroethylene, iron oxide coated with coke, coal, sand and mixtures thereof. For a bubble column reactor to be used in hydroconversion reactions, it is particularly preferable in accordance with the present invention to provide solid particle material which also serves as a hydroconversion catalyst such as $Co/Mo/Al_2O_3$, $Ni/Mo/Al_2O_3$, $Ni/Co/Mo/Al_2O_3$, bauxite, limonite and the like which are effective as a catalyst for treating hydrocarbon liquid with hydrogen gas under hydroconversion conditions. Other examples of suitable particles for use in accordance with the invention include glass particles and plastic particles, such as polyvinylchloride (PVC), polyethylene adipate (PEAD), polypropylene (PP), high density polyethylene (HDPE) and the like.

It has been found in accordance with the present invention that for typical hydrocarbon liquids and hydrogen as the gas phase, preferred solid particles have a particle diameter of between about 100 microns and about 1500 microns, more preferably between about 300 microns and about 800 microns, and preferably have a particle density of between about 1.5 and about 3.0 g/cm³. These particles are found to advantageously provide minimum fluidization velocities as well as gas phase and liquid phase particle settling velocities which allow a broad range of gas and liquid superficial velocities which can be used during a process employing solid particles according to the invention to suppress foam. Of course, other particle sizes and densities, velocities and the like may be used, the objective being to utilize a combination of these parameters which provides the particles in a fluidized bed within a bubbly liquid portion beneath the foam in a foaming system.

A wide variety of particles have been found in accordance with the present invention to advantageously suppress foam when fluidized in the liquid phase of the system or vessel in question. It has further been found in accordance with the present invention, however, that excellent results are provided by using particles having at least an exterior surface which is liquid phase phobic in nature. Preferably, the particles exhibit a contact angle with liquid in the system of greater than or equal to about 90°. Although philic particles have been found to be effective in suppression of foam according to the invention, phobic particles are most preferred as set forth above.

The material of the solid particles is preferably selected so as to provide phobic particles. Phobic materials exhibit a contact angle with the liquid, measured from the material, inside a droplet of the liquid to the liquid-gas boundary of the droplet, which is greater than or equal to about 90°. Phobic particles may be provided of a material which itself is phobic in nature with respect to the liquid phase in question, such as coke, coal, polytetrafluoroethylene, polypropylene, polyethylene and the like, or may be provided of any other material and coated or treated to provide the desired phobic surface quality. For example, particles could be coated with a phobic resin, or could be treated with chlorinated silane to provide the desired surface. Such phobic particles are believed to be advantageous in suppressing and breaking foam in vessels or reactors having foaming tendencies, and maintain phobic quality through prolonged exposure to or submersion in liquids.

Of course, and as set forth above, philic materials are also suitable and within the scope of the present invention for suppressing foam by fluidizing the particles in the liquid phase of the system.

Philic glass and plastic particles were evaluated in several foaming systems to determine the contact angle. A water/sodium dodecyl sulphate (SDS) and a water/1 wt. % 1-pentanol/SDS system were each tested with glass and plastic (PVC) particles. Both types of particles exhibited contact angles significantly less than 90° with water, as set forth below in Table 1, thereby indicating that both materials are hydrophilic and wettable by the foaming systems tested.

TABLE 1

| | Glass | | | Plastic (PVC) | | |
|---|---|---|---|---|---|---|
| | water/SDS | water/1 wt % 1-pentanol/SDS | | water/SDS | water/1 wt % 1-pentanol/SDS | |
| SDS (wt %) | cont. angle (°) | SDS (wt %) | cont. angle (°) | SDS (wt %) | cont. angle (°) | SDS (wt %) | cont. angle (°) |
| 0.0195 | 20 | 0.01 | 12 | 0.0195 | 67 | 0.01 | 36 |
| 0.0413 | 17 | 0.04 | 12 | 0.0317 | 39 | 0.02 | 34 |
| 0.0618 | 16 | 0.08 | 13 | 0.04 | 41 | 0.04 | 34 |
| 0.0989 | 15 | 0.2 | 16 | 0.0515 | 40 | 0.08 | 34 |
| 0.299 | 9 | — | — | 0.0618 | 40 | — | — |

A number of solid particulate materials were also tested for contact angle with various hydrocarbons, specifically Zuata crude, fuel oil No. 6, used motor luboil SAE 30, and motor luboil SAE 30. Various solids tested included alumina, glass, coke, lignite, polytetrafluoroethylene, and iron oxide particles coated with coke. The contact angle exhibited by each of these materials for each hydrocarbon is listed below in Table 2.

TABLE 2

| | CONTACT ANGLE (°) | | | |
|---|---|---|---|---|
| SOLIDS | ZUATA CRUDE | FUEL OIL NO. 6 | USED MOTOR LUBOIL SAE | MOTOR LUBOIL SAE 30 |
| Alumina | 56 | 16 | 24 | 20 |
| Glass | 53 | 27 | 23 | 16 |
| Coke | 38 | 24 | 26 | 15 |
| Lignite | 51 | 23 | 20 | 19 |
| Polytetra Fluoroethylene | 38 | 24 | — | — |
| Iron Oxide coated w/ coke | 42 | 30 | 27 | 12 |

As shown above, each of these materials is a suitable oleophilic material for use as solid particle additive with the identified liquid in accordance with the present invention.

Two different types of phobic particles were used in order to demonstrate the advantage of use of phobic and philic particles. Both particle samples are sand particles commercially supplied by STIM-LAB and Science Kit & Boreal Labs. The materials are further described in Table 3 below:

TABLE 3

| Provider | Water Affinity | Surface Treatment | Density g/cc | Size Distribution μm |
|---|---|---|---|---|
| STIM-LAB | hydrophilic | none | 2.65 | 600–850 |
| | hydrophobic | resin coating | 2.65 | 600–850 |
| Science Kit & Boreal Labs. | hydrophilic | none | 2.4 | 300–425 |
| | hydrophobic | chlorinated silanes | 2.4 | 300–425 |

Philic particles were provided as particles of sand which are naturally hydrophilic. Two separate samples of sand were treated to provide hydrophobic surfaces thereon. The first sample, provided by Science Kit & Boreal Labs, was treated with reactive chlorinated silane to provide hydrophobic particles (Commercial Product name: Hydrophobic Particles Catalog Number: 65694). The second sample was provided by STIM-LAB and was treated through the application of a very thin coating of Rosin, which is a hydrophobic resin.

As set forth above, fluidized beds of a particulate material within the liquid phase of a hydrocarbon treatment reactor or vessel have been found to suppress foaming in accordance with the present invention. In this regard, oleophilic particles are effective, and oleophobic particles are most preferred.

The contact angle of the liquid with the phobic particles of both sand samples was not measured because of the small particle size. In order to identify the phobic nature of these particles, the Hydrophobic Index method proposed by Laurier was used (Foams: Fundamentals and Applications in the Petroleum Industry, Editor: Schramm L. Laurier, Page 466, American Chemical Society (1994)). The particles were placed on water, following the procedure of Laurier, and showed a tendency to float and to produce agglomerates in water, indicating the hydrophobic nature of the particles. Therefore, it is concluded that the contact angle of these particles is greater than 90°.

The following examples will demonstrate advantages of the present invention.

EXAMPLE 1

In this example, the effect of addition of solid particles according to the invention to foaming and non-foaming systems is demonstrated.

Figure 2:
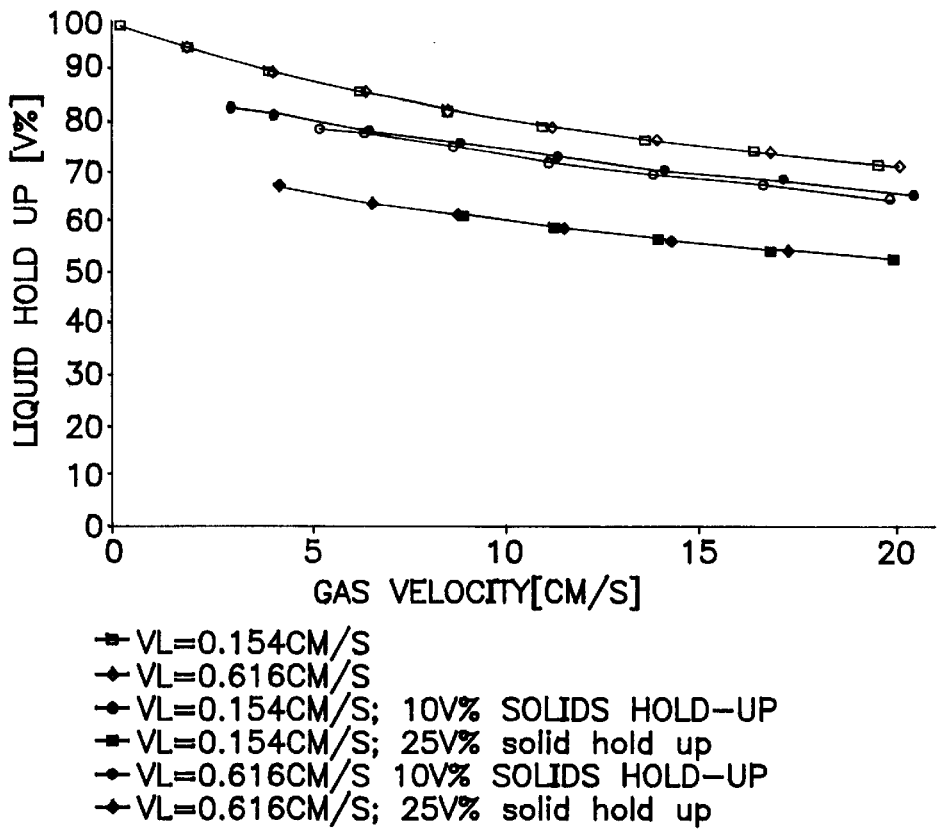
FIG. 2 illustrates liquid hold-up for a non-foaming system treated with solid particles.

A system having distilled water as the liquid was used. Glass particles having an average diameter of 532 microns were added to the liquid of the system at varying amounts and liquid and gas velocities, all of which were non-foaming. FIG. 2 shows the results of these tests in terms of liquid hold up or liquid volume percentage in the reactor. As shown, for non-foaming systems, solid particles actually reduced the liquid hold up, thereby indicating that the solid particles of the present invention are not useful for non-foaming systems.

EXAMPLE 2

Figure 3:
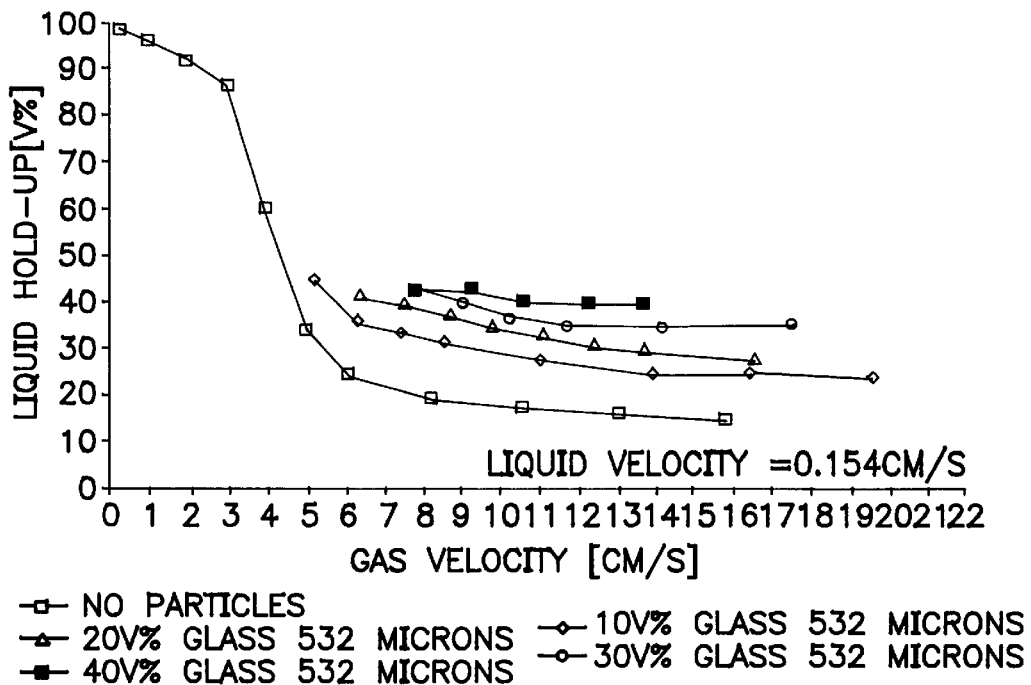
FIG. 3 illustrates liquid hold-up for a foaming system treated with particles according to the invention, at a low liquid superficial velocity.
Figure 4:
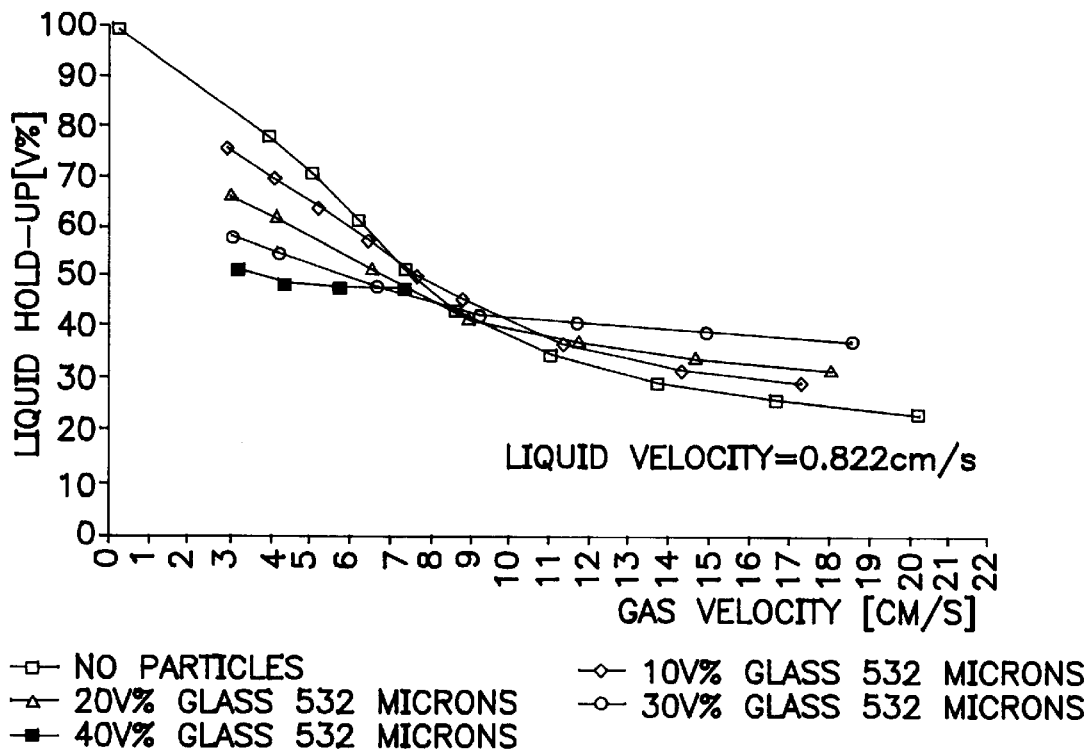
FIG. 4 illustrates liquid hold-up for a foaming system treated according to the invention, at a higher liquid superficial velocity.

This example demonstrates the effective suppression of foaming using solid particles according to the invention on a foaming system. A system was tested using a foaming (water/1 wt % 1-pentanol/0.04 wt % SDS) system and the same glass particles of Example 1. At a liquid velocity of 0.154 cm/s and varying gas velocities, the glass particles were added to the liquid and liquid hold up or volume % in the reactor were determined. FIG. 3 shows that the system with no particles foamed and liquid hold up dropped to less than 20%. Systems treated with the solid particles according to the invention exhibited significantly higher liquid hold up values, and thereby exhibited suppressed tendency to foam. To further illustrate the effect of using the solid particles in foaming systems as opposed to non-foaming systems, further tests were run using the same glass particles and increasing gas velocity from low values with no foaming to higher values which do create a foaming system. FIG. 4 shows, for the same liquid system, values of liquid hold up obtained for the various gas velocities and additions of solid particles. As shown, up to gas velocities of about 9 cm/s, the system is non-foaming and addition of solid particles does not provide beneficial results. At gas velocity higher than 9 cm/s, however, addition of solid particles according to the invention shows clear increases in liquid hold up as desired.

EXAMPLE 3

Figure 5:
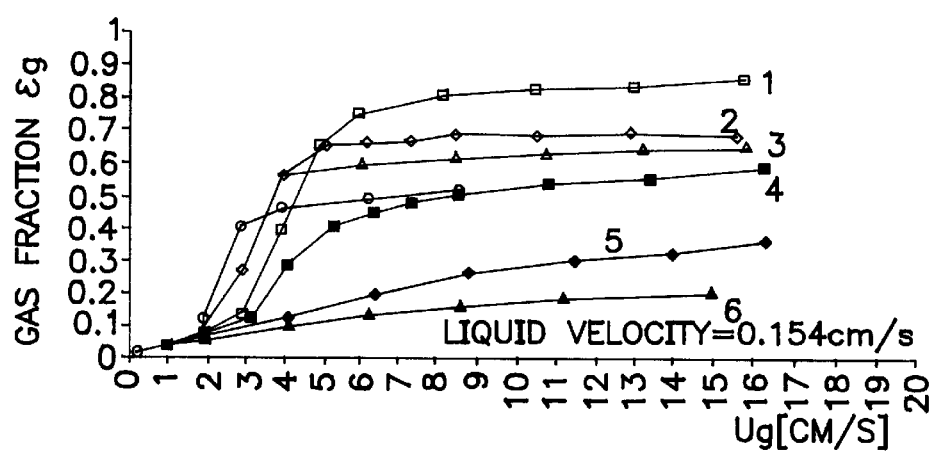
FIG. 5 illustrates the effect of particle size on the gas fraction of a foaming system treated according to the invention.
Figure 6:
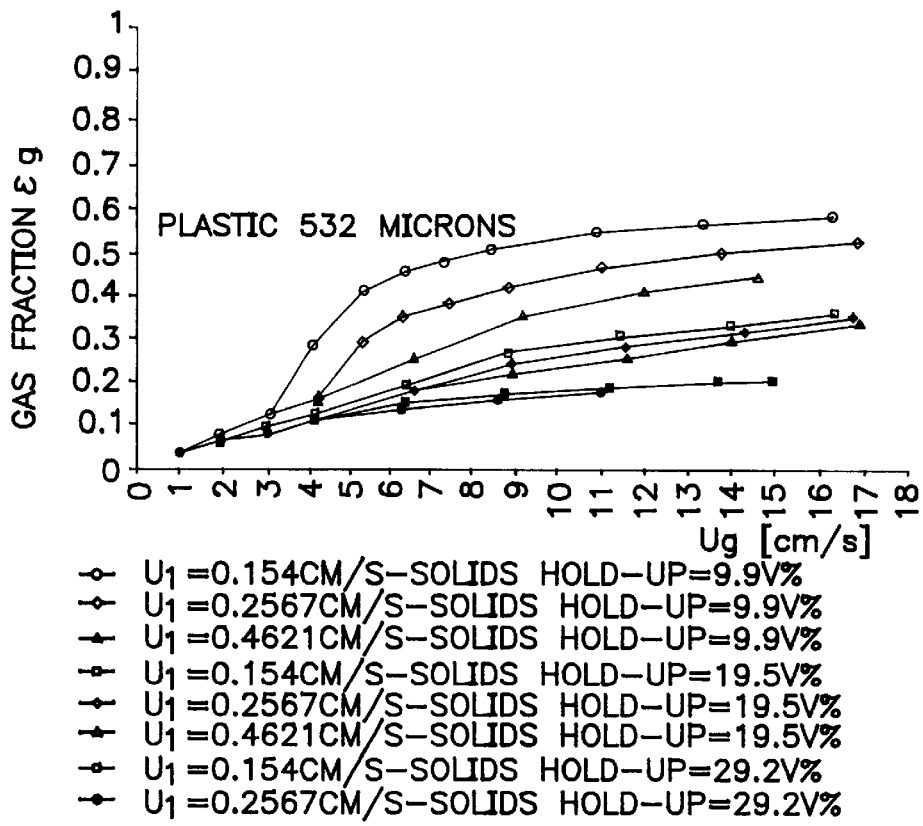
FIG. 6 further illustrates the gas fraction of a foaming system treated according to the invention.

In this example, similar results are obtained using plastic particles in accordance with the present invention, using the same liquid system of Example 2. The results of these tests also show that as the surface area of solid particles according to the invention increases, better results are obtained. Plastic (PVC) particles were added in varying amounts and sizes to the same foaming system of Example 2 above. FIG. 5 shows the results of the tests for varying gas flow velocities and particle surface area. In FIG. 5, the numbered plots are as follows: (1) no particles, (2) 10V % 1068 $\mu$m (area 5.6 cm$^2$/cc), (3) 20 v % 1068 $\mu$m, (area 11.2 cm$^2$/cc), 20 V % 1068 $\mu$m (area 16.9 cm$^2$/cc), (4) 9.9 V % 532 $\mu$m (area 11.2 cm$^2$/cc), (5) 19.5 V % 532 $\mu$m (area 16.9 cm$^2$/cc), (6) 29.2 V % 532 $\mu$m (area 32.9 cm$^2$/cc). As shown, the gas fraction in the reactor was highest for this foaming system when no particles were added, and best results were obtained with plastic particles having a surface area of 32.9 cm$^2$/cc. FIG. 6 shows results of additional tests run using plastic particles having an average particle diameter of 532 microns, at varying gas and liquid velocities and different amounts of solids. As shown, within the ranges tested, higher amounts of solids resulted in reduced gas fraction % within the reactor.

EXAMPLE 4

Figure 7:
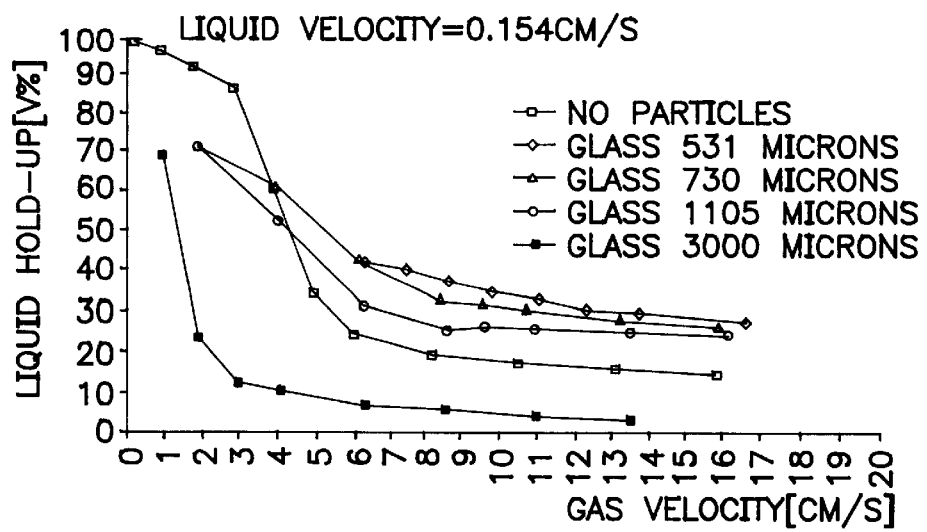
FIG. 7 illustrates the effect of particle size on liquid hold-up of a system treated according to the invention.

This example further illustrates the advantageous effects of adding particles of selected size in accordance with the invention. A foaming system of (water/1 wt % 1-pentanol/0.04 wt % SDS) was tested at varying gas velocities and a liquid velocity of 0.154 cm/s using no particles, and using 20% by volume of particles having particle sizes of 531, 730, 1105 and 3000 microns. The results are shown in FIG. 7. As shown, particles having diameters of 531, 730 and 1105 microns showed beneficial increases of liquid hold up values as opposed to using no particles. However, the 3000 micron particle size resulted in a decrease in liquid hold up. Table 4 below shows the relation of minimum liquid fluidization velocity ($U_{LM}$) with the liquid and gas velocity for each particle size. $U_{LM}$ values were estimated by Song's correlation (Fan, L. S., "Gas-Liquid-Solid Fluidization Engineering", Butterworths, 1989, p. 42–43).

TABLE 4

| particle size (microns) | liquid velocity $V_L$ (cm/s) | gas velocity $V_g$ (cm/s) | minimum liquid fluidiz'n velocity $U_{Lm}$ (cm/s) | fluidiz'n observed yes/no |
|---|---|---|---|---|
| 531 | 0.154 | 6.0 | 0.15 | yes |
| 531 | 0.154 | 10.0 | 0.10 | yes |
| 531 | 0.154 | 16.0 | 0.092 | yes |
| 1105 | 0.154 | 6.0 | 0.81 | partial |
| 1105 | 0.154 | 10.0 | 0.52 | partial |
| 1105 | 0.154 | 16.0 | 0.46 | partial |
| 3000 | 0.154 | 6.0 | 16.9 | no |
| 3000 | 0.154 | 10.0 | 8.8 | no |
| 3000 | 0.154 | 13.0 | 8.1 | no |

As shown, fluidization was observed when the liquid velocity was greater than the minimum liquid fluidization velocity. Thus, the 3000 micron particles which in this system do not fluidize also did not provide beneficial results as shown in FIG. 7, thereby demonstrating that fluidization of particles according to the invention clearly provides beneficial reduction or suppression of foaming and increased liquid hold up or volume in the reactor as desired.

EXAMPLE 5

This example demonstrates that liquid phase phobic particles compare favorably to philic particles in suppressing foam in systems having a tendency to foam.

Figure 8:
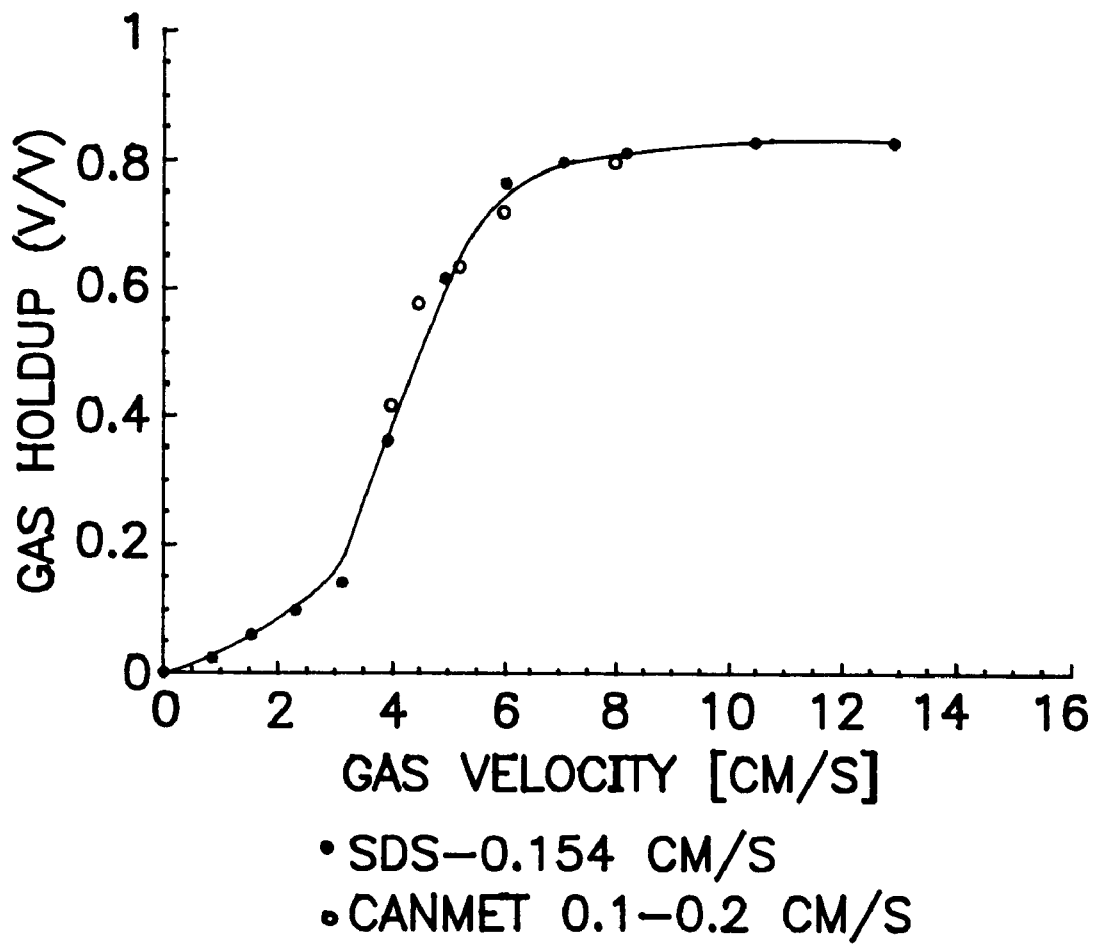
FIG. 8 illustrates gas hold-up versus gas velocity for a narrow slit geometry test vessel and a commercial system.

A foaming system was used for this comparison using a solution of 0.06% wt. sodium dodecyl sulphate (SDS) plus 1% wt. 1-butanol in water solution. This solution gives rise to a foam which is 85% gas. This system was used to duplicate a commercial process using a reactor having a diameter of 2 meters, which process is subject to foaming. (See Pruden, B. B. The Canmet Hydrocracking Process: Recent Developments, Proceedings of the Conference Oil Sand Our Petroleum Future, Page 276–282 (1993). The accuracy of the system is illustrated in FIG. 8. As shown, gas holdup of the model system at liquid velocity of 0.154 cm/s closely follows that of the commercial CANMET process at liquid velocity in the range of 0.1–0.2 cm/s.

In order to demonstrate the advantageous use of phobic particles as discovered in accordance with the present invention, the particles of Table 3 were tested.

The above indicated SDS system was evaluated at various different liquid and gas velocities using no particles and using the philic and phobic particles of Table 3 above.

Figure 9A:
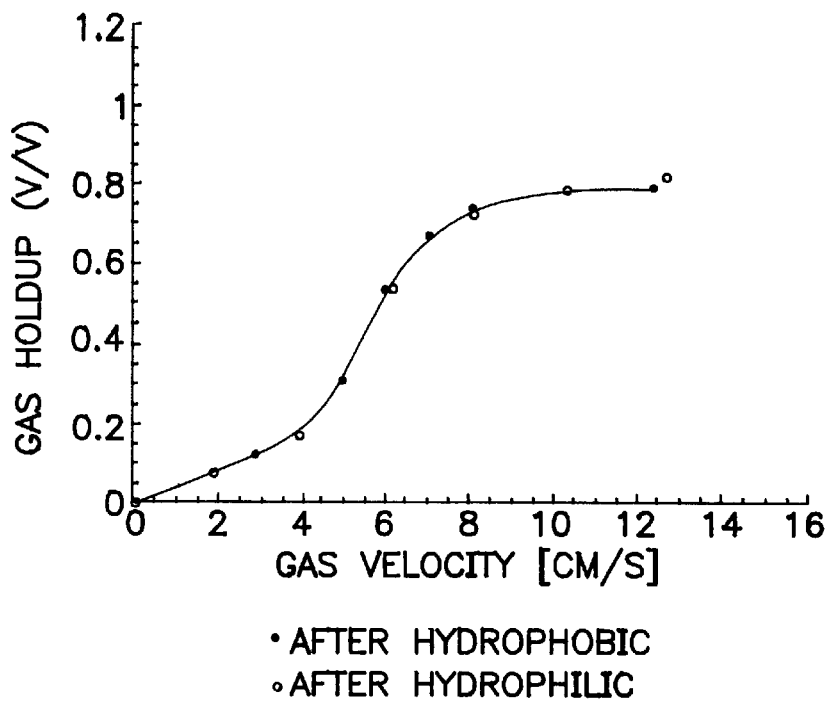
FIGS. 9a and 9b illustrate gas hold-up and foam fraction as a function of gas velocity for a system without particles after treatment with liquid phase philic and phobic particles.
Figure 9B:
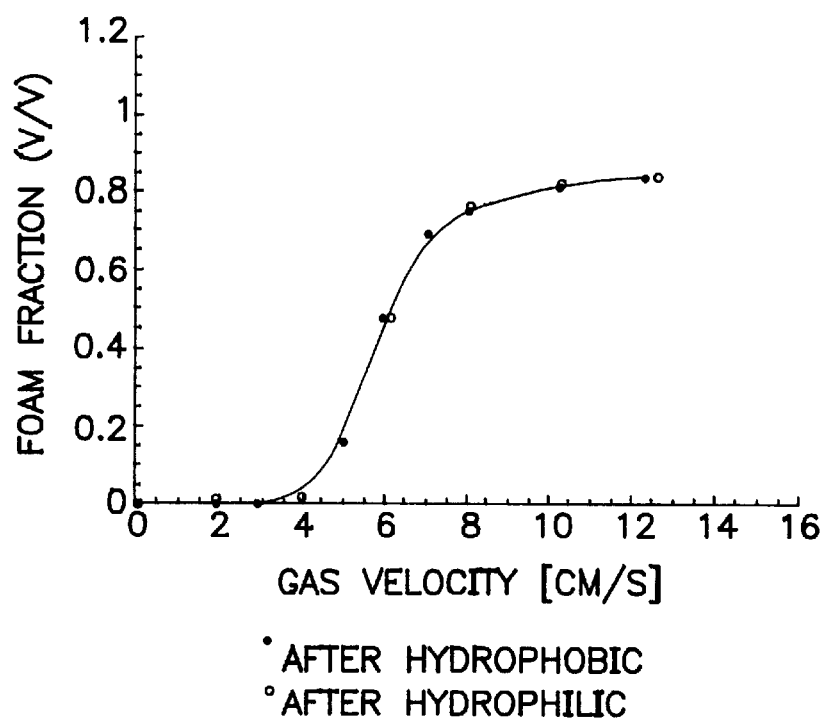

Initially, as a control to ensure that surface treated phobic particles were not altering the system, a number of measurements of gas holdup and foam fraction were taken at different gas velocities and a liquid velocity of 0.205 cm/s for a 0.06% wt. SDS plus 1.0% wt 1-butanol solution without particles after having been used with both philic and the surface treated phobic particles. As shown in FIGS. 9a and 9b, the system showed no change indicating that the presence of the surface treated particles did not modify the foaming characteristics of the foaming system.

Figure 10A:
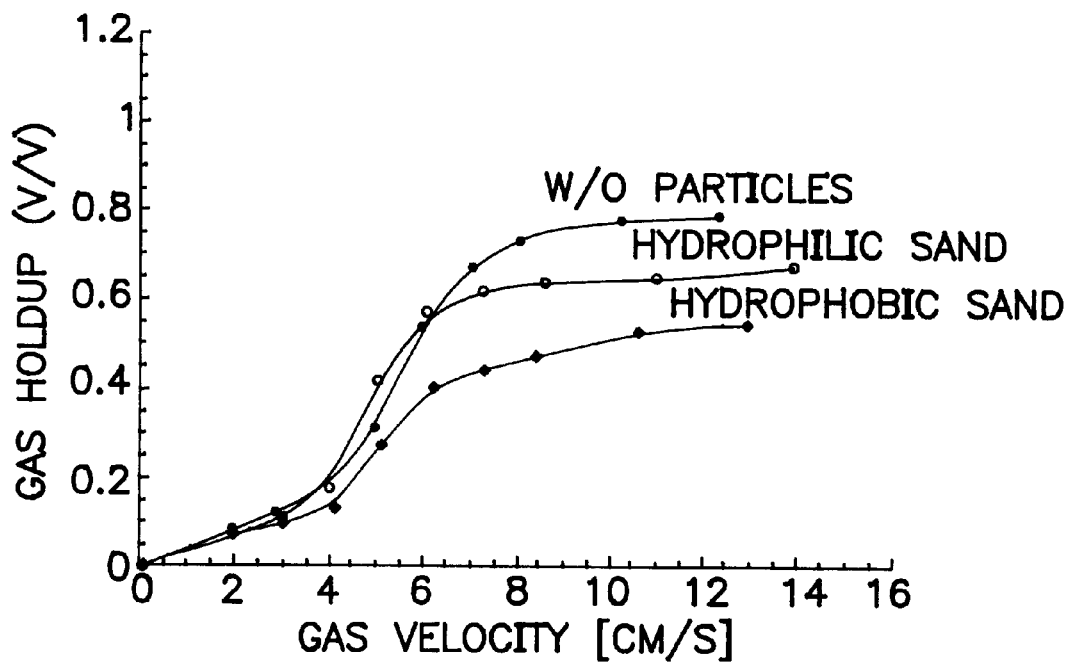
FIGS. 10a and 10b show gas hold-up and foam fraction versus gas velocity at a liquid velocity of 0.205 cm/s for a system without particles, with liquid phase philic particles and with liquid phase phobic particles.
Figure 10B:
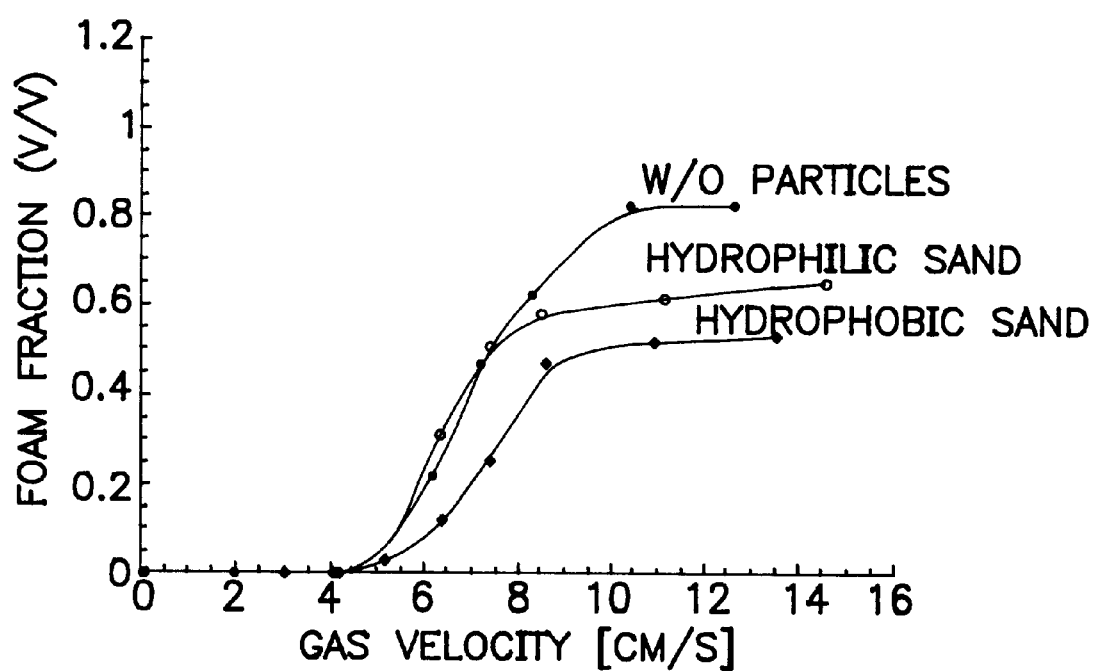
Figure 11A:
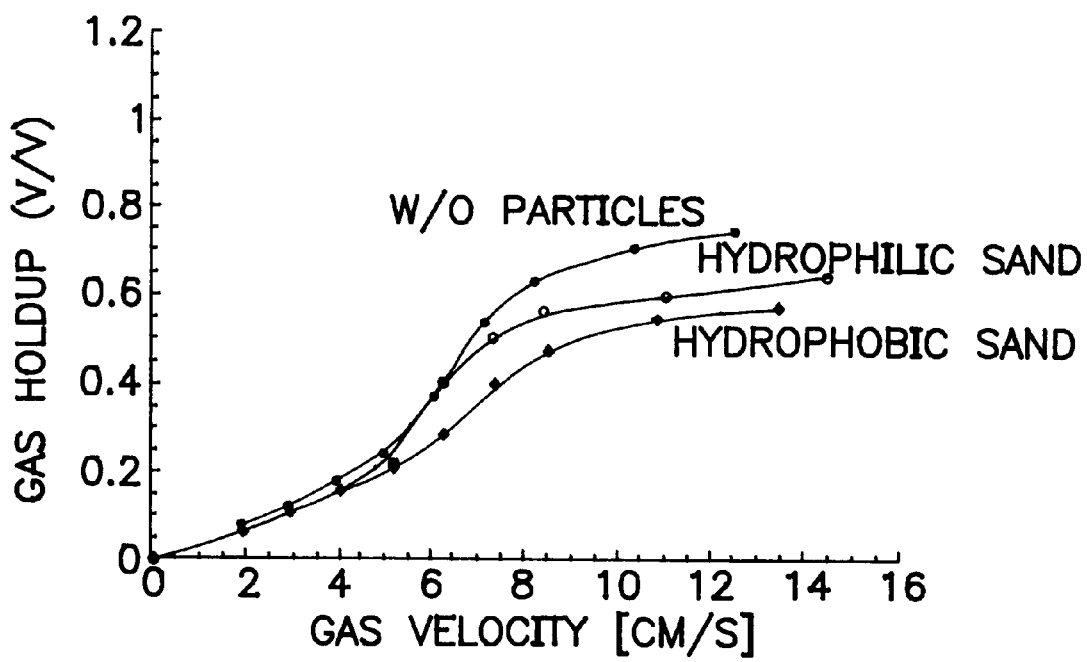
FIGS. 11a and 11b show gas hold-up and foam fraction versus gas velocity at a liquid velocity of 0.411 cm/s for a system without particles, with liquid phase philic particles and with liquid phase phobic particles.
Figure 11B:
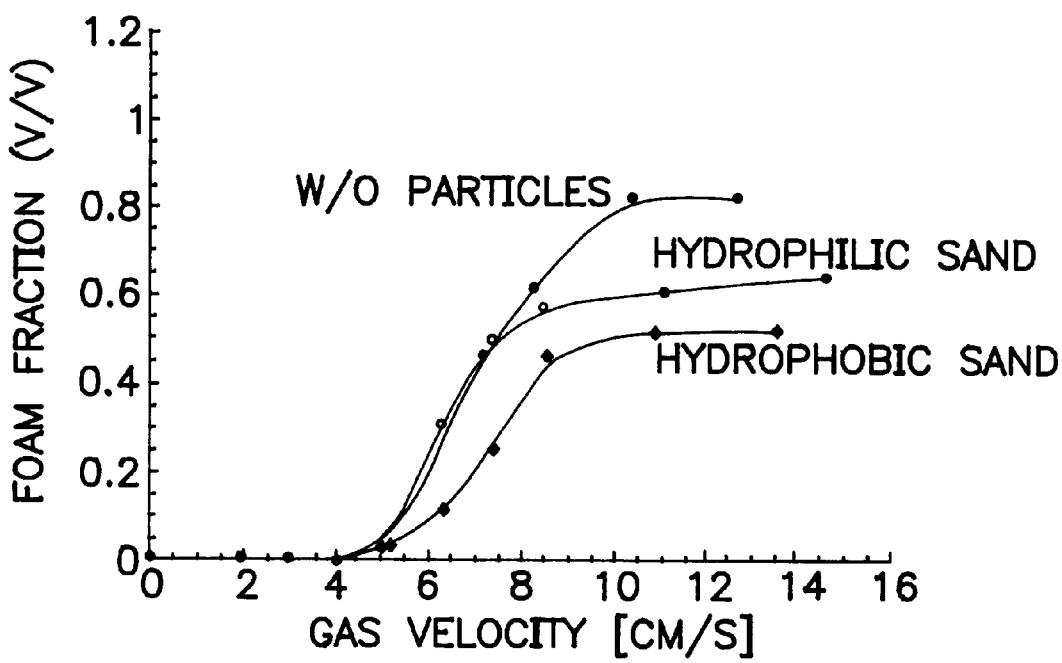

A 10% vol. fraction of phobic and philic particles was then used in the model system at varying gas velocities and a liquid velocity of 0.205 cm/s (FIGS. 10a, 10b) and at varying gas velocities and a liquid velocity of 0.418 cm/s (FIGS. 11a, 11b). As shown in these figures, the phobic particles clearly showed the best performance in suppressing foam as demonstrated by the lowest value of gas holdup and foam fraction as compared to philic particles and the particle free system.

Figure 12A:
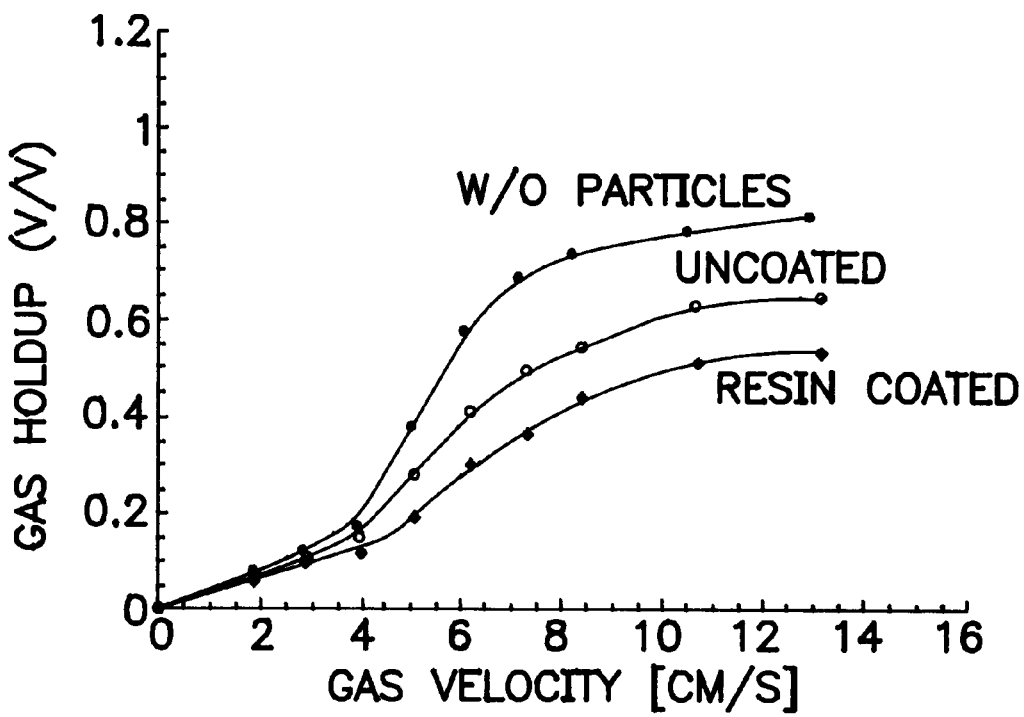
FIGS. 12a and 12b show gas hold-up and foam fraction versus gas velocity at a liquid velocity of 0.205 cm/s for a system without particles, with uncoated or liquid phase philic particles, and with resin coated or liquid phase phobic particles.
Figure 12B:
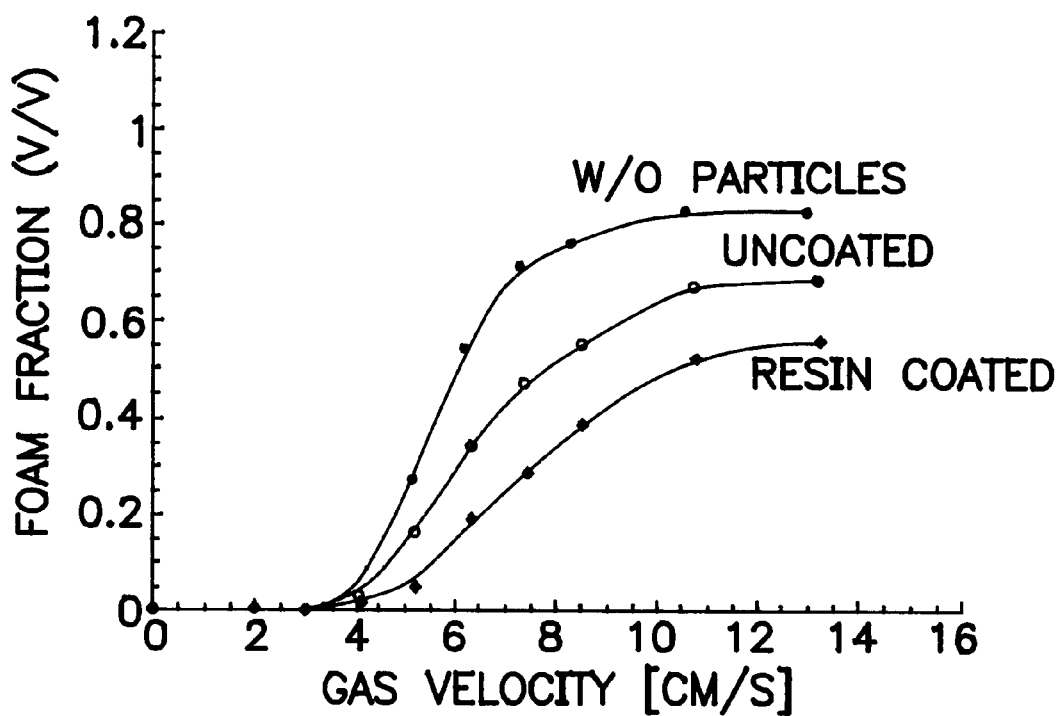
Figure 13A:
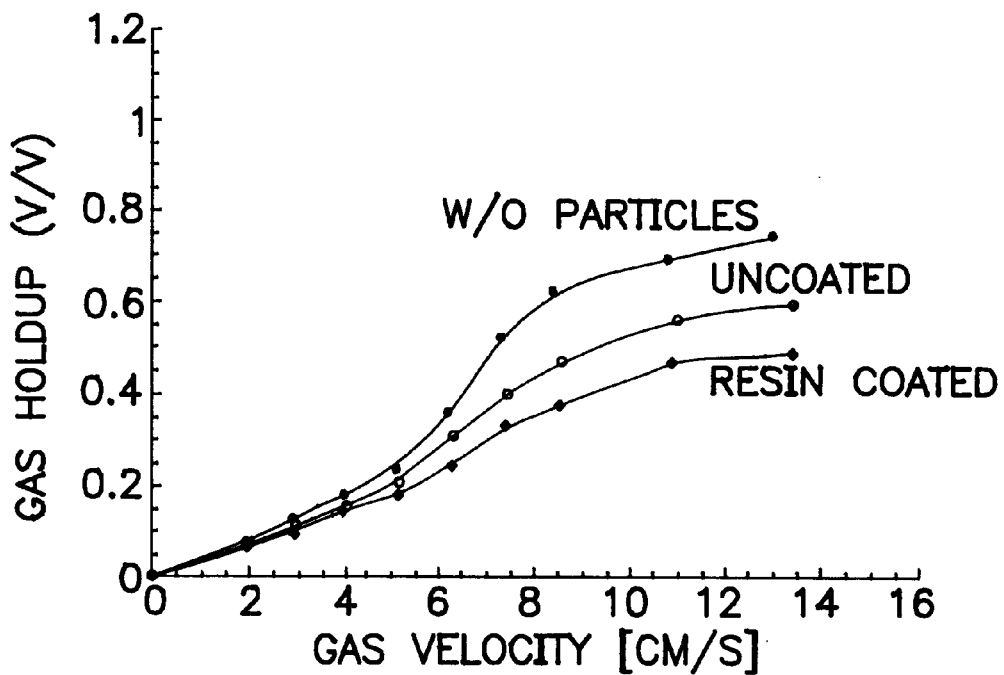
FIGS. 13a and 13b show gas hold-up and foam fraction versus gas velocity for a liquid velocity of 0.411 cm/s for a system without particles, a system with liquid phase philic particles and a system with liquid phase phobic particles.
Figure 13B:
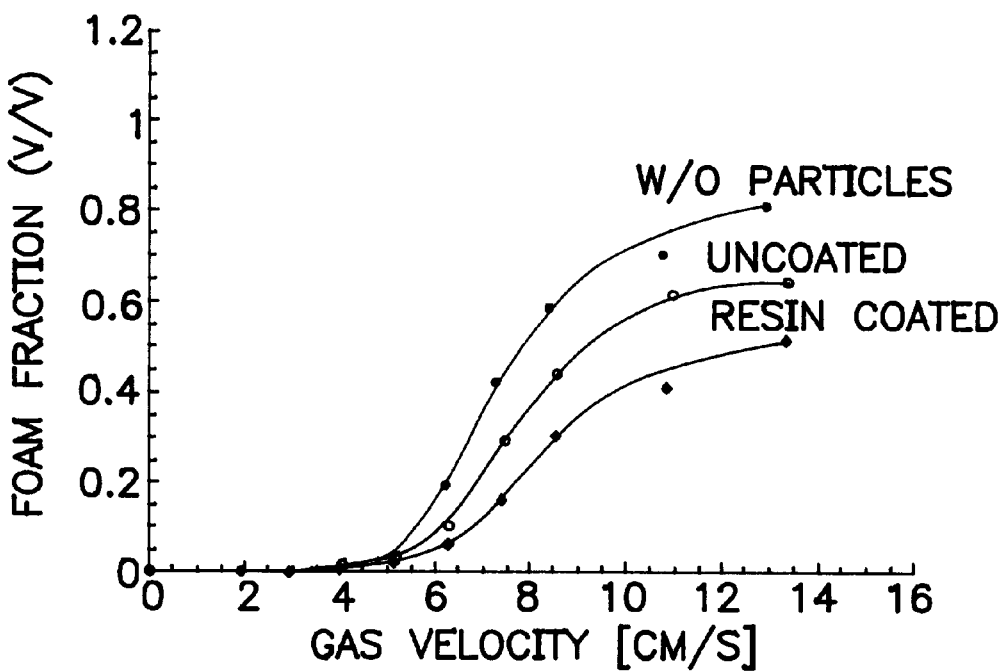

A similar series of tests were conducted using a 10% vol. fraction of uncoated particles and particles coated with resin from STIM-LAB. Tests were carried out at varying gas velocities and a liquid velocity of 0.205 cm/s (FIGS. 12a, 12b), and 0.411 cm/s (FIGS. 13a, 13b). Referring to these figures, better foam suppression was illustrated using resin coated phobic particles at each of the liquid velocities.

Figure 14A:
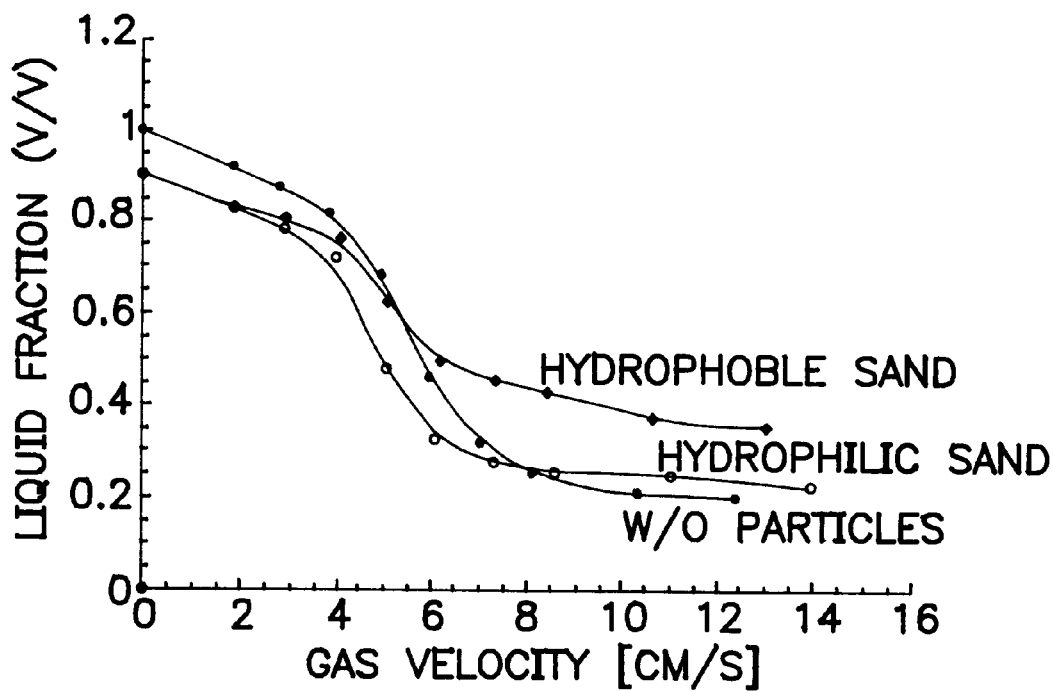
FIGS. 14a and 14b show liquid fraction versus gas velocity for two types of liquid phase phobic particles as compared to liquid phase philic particles and systems without particles.
Figure 14B:
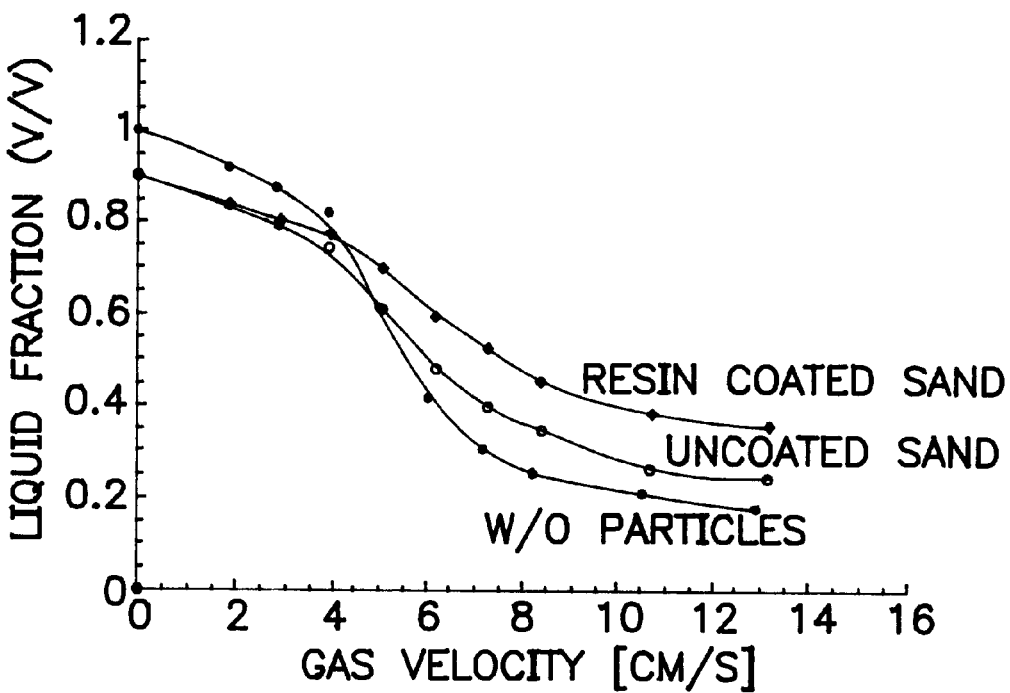

Referring now to FIGS. 14a, 14b, the liquid fraction resulting from a system having a liquid velocity of 0.411 cm/s without particles and with philic and phobic sand particles (FIG. 14a) and uncoated and resin coated sand particles (FIG. 14b) is illustrated for various gas velocities. As shown, below gas velocities of about 4.0 cm/s there is no foam in the vessel and the phobic particles do not provide enhanced results. Above 4.0 cm/s, once the system begins to foam, the phobic particles clearly provide the best results in accordance with the present invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for suppressing foam formation in a vessel, comprising the steps of:
   feeding a liquid and a gas to a vessel at a liquid velocity and a gas velocity respectively;
   adding particles of a solid material wherein said particles are selected from the group consisting of liquid phase phobic particles, liquid phase philic particles, and mixtures thereof to said liquid, said particles having a particle size and a particle density; and
   selecting at least one of said liquid velocity, particle size and particle density so as to fluidize said particles in said liquid, wherein said particle size and particle density are selected so as to provide (1) a minimum liquid fluidization velocity which is less than said liquid velocity, and (2) a liquid phase particle settling velocity which is greater than said liquid velocity whereby said particles are fluidized in and not entrained by said liquid, whereby foam formation in said vessel is suppressed.

2. A process according to claim 1, wherein said particles comprise a particle substrate having a liquid phase phobic coating.

3. A process according to claim 2, wherein said coating is a liquid phase phobic resin.

4. A process according to claim 1, wherein said particles comprise a particle substrate having a surface treated with chlorinated silane.

5. A process according to claim 1, further comprising the step of confining said particles within said vessel whereby said adding step is carried out by feeding said liquid to said vessel.

6. A process according to claim 1, wherein said adding step comprises adding said particles to said liquid before feeding said liquid to said vessel.

7. A process according to claim 1, wherein said adding step comprises releasing said particles from within said vessel.

8. A process according to claim 1, wherein said liquid velocity is between about 0.1 cm/s to about 2.0 cm/s and said gas velocity is between about 0.1 cm/s to about 20 cm/s.

9. A process according to 1, wherein said particles are particles of a material selected from the group consisting of plastic, glass and combinations thereof.

10. A process according to claim 1, wherein said liquid is hydrocarbon and said particles are particles of a material selected from the group consisting of alumina, glass, coke, lignite, polytetrafluoroethylene, iron oxide coated with coke, coal, sand and mixtures thereof.

11. A process according to claim 1, wherein said particles have a particle diameter of between about 100 to about 1500 microns.

12. A process according to claim 1, wherein said particles have a particle diameter of between about 300 to about 800 microns.

13. A process according to claim 1, wherein said adding step comprises adding said particles in an amount greater than or equal to about 1% wt. based on liquid flow to the vessel.

14. A process according to claim 1, wherein said adding step comprises adding said particles in an amount between about 1% and about 6% wt. based on liquid flow to the vessel.

15. A process according to claim 1, wherein said liquid is a hydrocarbon and said gas is selected from the group consisting of hydrogen, carbon monoxide, synthesis gas, and mixtures thereof, and further comprising subjecting said liquid and said gas to hydroconversion or synthesis conditions.

16. A process according to claim 15, wherein said particles are particles of a hydroconversion catalyst.

17. A process according to claim 16, wherein said hydroconversion catalyst is selected from the group consisting of $Co/Mo/Al_2O_3$, $Ni/Mo/Al_2O_3$, $Co/Ni/Mo/Al_2O_3$, bauxite, limonite and mixtures thereof.

18. A process according to claim 1, wherein said particles are selected having a particle size and particle density sufficient in combination with velocity, viscosity and density of said liquid and velocity, viscosity and density of said gas that said particles are substantially homogeneously dispersed through said liquid phase and are not entrained by said gas.

19. A process according to claim 1, wherein said particles are liquid phase phobic and have a contact angle with said liquid of greater than about 90°.

* * * * *